(12) United States Patent
Nozaki et al.

(10) Patent No.: US 6,196,720 B1
(45) Date of Patent: Mar. 6, 2001

(54) BEARING FOR AUTOMOBILE PULLEYS

(75) Inventors: Seiichi Nozaki, Okayama-ken; Takahiro Koremoto, Iwata, both of (JP)

(73) Assignee: NTN Corporation, Osaka-fu (JP)

( * ) Notice: Subject to any disclaimer, the term of this patent is extended or adjusted under 35 U.S.C. 154(b) by 0 days.

(21) Appl. No.: 09/264,870

(22) Filed: Mar. 9, 1999

(30) Foreign Application Priority Data

Mar. 19, 1998 (JP) .................................................. 10-070482

(51) Int. Cl.[7] ...................................................... F16C 33/12
(52) U.S. Cl. ................................................................ 384/13
(58) Field of Search ............................... 384/13; 508/364; 474/43

(56) References Cited

U.S. PATENT DOCUMENTS

| | | | |
|---|---|---|---|
| 4,668,411 | * 5/1987 | Yasui et al. ........................... | 252/51.5 |
| 4,755,309 | * 7/1988 | Kobori et al. ........................ | 252/49.3 |
| 5,043,085 | * 8/1991 | Kinoshita et al. ................... | 252/49.9 |
| 5,512,188 | * 4/1996 | Kinoshita et al. ................... | 252/18 |
| 5,576,272 | * 11/1996 | Okawa et al. ........................ | 508/159 |
| 5,725,448 | * 3/1998 | Kato et al. ........................... | 474/43 |
| 5,840,666 | * 11/1998 | Yokouchi et al. ................... | 384/13 X |
| 5,922,654 | * 7/1999 | Yamazaki et al. .................. | 508/364 |
| 6,020,290 | * 2/2000 | Takata et al. ........................ | 508/364 |

FOREIGN PATENT DOCUMENTS

| | | |
|---|---|---|
| 8-113793 | * 5/1996 | (JP) . |
| 58-185693 | * 7/1996 | (JP) . |
| 8-176578 | * 7/1996 | (JP) . |

\* cited by examiner

*Primary Examiner*—Dirk Wright
(74) *Attorney, Agent, or Firm*—Arent Fox Kintner Plotkin & Kahn, PLLC

(57) ABSTRACT

According to the present invention, PAO oil and ester oil are mixed in a ratio by weight of from 50:50 to 90:10 to provide a base oil having a viscosity of not more than 70 $mm^2/S$ at 40° C., to which base oil is then added 5–25% by weight of diurea, which is an alicyclic compound, serving as a thickener, and ZnDTC, which is an additive. The grease thus prepared is filled in a bearing 2. This bearing 2 is fitted in the inner portion of a pulley body 1 having a pulley peripheral surface is to be contacted by a belt driven by the engine of an automobile. Thereby, brittle peeling occurring in the raceway surfaces and ball surfaces, and abnormal noise under cold ambient can be reliably prevented.

2 Claims, 3 Drawing Sheets

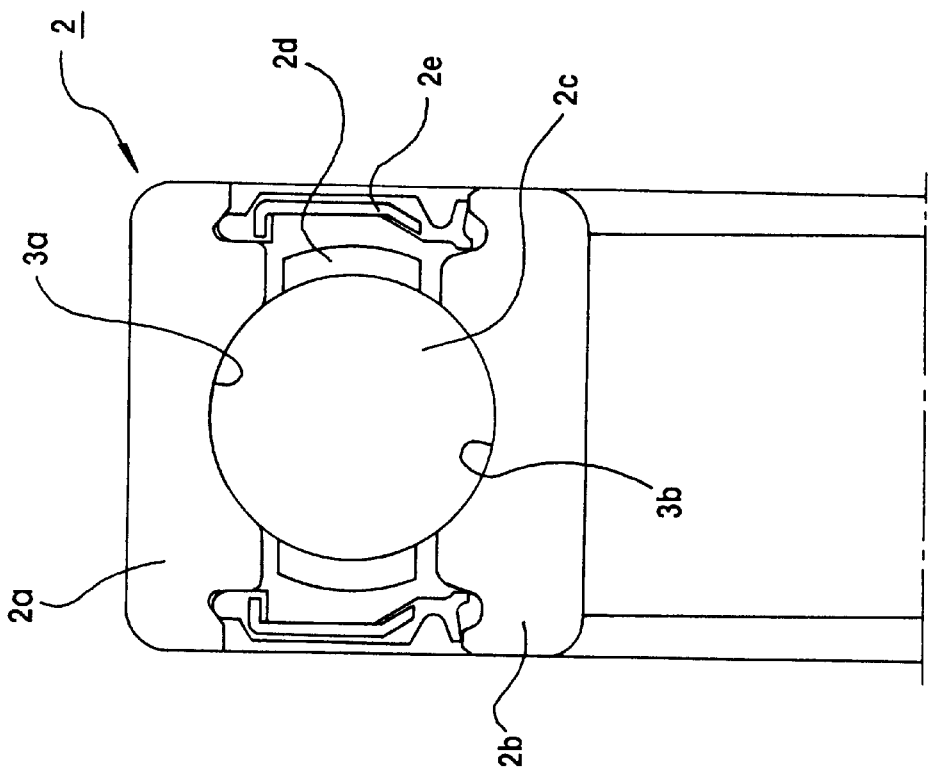
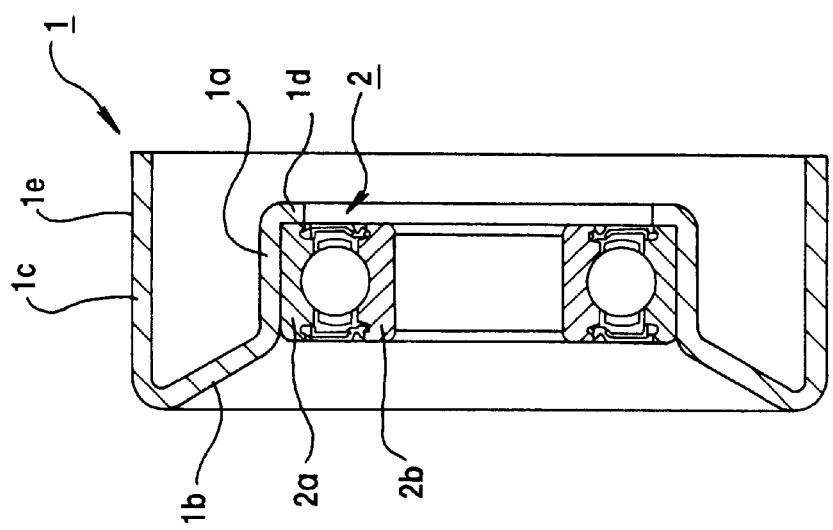

FIG.3

| | COMPOSITION | | VISCOSITY AT 40°C [cSt] | ABNORMAL NOISE | | BRITTLE PEELING | |
|---|---|---|---|---|---|---|---|
| | BASE OIL | THICKENER | | DEEP GROOVE | THREE-POINT CONTACT | DEEP GROOVE | THREE-POINT CONTACT |
| A | PAO+ESTER | ALIPHATIC+ALICYCLIC | 42.7 | △ | — | × | × |
| B | PAO+ESTER | ALIPHATIC | 40.6 | ○ | ◎ | △ | × |
| C | PAO+ESTER | ALICYCLIC | 46.9 | ○ | ○ | ○ | ○ |

BEARING FOR AUTOMOBILE PULLEYS

BACKGROUND OF THE INVENTION

The present invention relates to a bearing used for a pulley that contacts a timing belt for automobile engines, an auxiliary machine driving belt or the like.

Idler pulleys are installed to increase the wrapping angle of a belt, such as a timing belt driven by the engine of an automobile or an auxiliary machine driving belt, so as to impart a suitable tension to the belt. As for pulleys, there is a pulley of the type (having the so-called "hat type" outer ring) in which a pulley peripheral surface to be contacted by a belt is formed directly on the outer surface of the outer ring of a ball bearing; however, idler pulleys of the type in which a pulley body having a pulley peripheral surface and a ball bearing are fitted together are frequently used.

In this type of pulleys, when the pulley body rotates as it receives the rotating force from the belt, the outer ring of the ball bearing fitted therein rotates together with the pulley body.

In this connection, when such pulley is operated in a cold ambient, an abnormal noise (hoot sound) is sometimes produced depending upon the pulley specifications or operating conditions. This abnormal noise in a cold environment, or the so-called abnormal noise under cold ambient, does not always occur in the market; rather, it depends on atmospheric temperature, etc., and in Japan it occurs only in very limited districts (Hokkaido, etc.). Further, it occurs in a brief time (one minutes at most) subsequent to the start of the engine of an automobile, with so such sound occurring thereafter. Further, it occurs more often when a single-row deep groove ball bearing is used as such ball bearing, while the use of an angular ball bearing of a plural row type results in lesser occurrence.

The abnormal noise under cold ambient has such complicated properties and the cause of occurrence thereof, though not yet having been clarified, is supposed from the results of various experiments to be the self-excited vibration of the rolling elements. More particularly, in a cold ambient, the viscosity of the base oil in a grease increases, tending to cause unevenness in the oil films on the raceway surfaces, which unevenness, in turn, minutely periodically varies the friction coefficient between the rolling bodies and the raceway surface, thereby causing the self-excited vibration of the rolling elements. This self-excited vibration is believed to cause the pulley system to resonate, producing the axial vibration (translation) of the outer ring, leading to the occurrence of abnormal noise under cold ambient.

Conventionally, as a abnormal noise under cold ambient preventive measure, investigations have been made as to the use of a grease which is superior in low temperature properties (a grease which, even in a cold environment, forms oil films uniformly on the areas of contact between the rolling elements and the raceway surfaces of the inner and outer rings). This preventive means is intended to effectively suppress the occurrence of abnormal noise under cold ambient by enhancing the lubricating performance of grease in a cold environment, and a substantial effect can be expected. However, since the viscosity of grease decreases, there is anxiety about the lubricating performance at high temperatures, possibly leading to a lowering of durability. Pulleys used in automobiles are operated at high temperatures and high speeds, and since their durability is one of the important characteristics, a measure that possibly leads to a lowering of durability cannot be employed.

Thus, a grease serving as a abnormal noise under cold ambient preventive measure is required to have two properties: oil film stability at low temperatures and durability at high temperatures. However, it is very difficult to satisfy these two contradictory properties at the same time.

On the other hand, even if a grease is effective for abnormal noise under cold ambient preventive measure, it could, depending upon its composition, cause brittle peeling in the raceway surface or the surface of the rolling elements. This brittle peeling, unlike the ordinary peeling in the raceway surface or the surface layers of the rolling bodies caused by metal fatigue, is a peculiar phenomenon of fracture that suddenly occurs from an inner region that is considerably deep, and it is believed that vibrations due to the trend toward higher speed cause mirror wear in the rolling surfaces, which wear, in turn, causes the formation of a fresh surface, thereby providing a catalytic action to decompose the grease, attended by evolution of hydrogen, the latter entering the steel to brittle the matrix. Therefore, in selecting a grease, it is necessary to consider not only abnormal noise under cold ambient but also the composition thereof from the viewpoint of brittle peeling.

Accordingly, an object of the invention is to provide a bearing for automobile pulleys that is capable of reliably preventing brittle peeling and abnormal noise under cold ambient.

SUMMARY OF THE INVENTION

To achieve said object, a bearing for a pulley used in an automobile according to the invention is a bearing fitting in the inner portion of a pulley body having a peripheral surface to be contacted by a belt driven by an engine of the automobile, and having a grease composition therein. The grease composition comprises a base oil having a mixture of PAO oil and ester oil in a ratio by weight of from 50:50 to 90:10 with a viscosity of not more than 70 mm$^2$/S (at 40° C.), a thickener having alicyclic diurea compound, wherein a ratio of said base oil and said thickener is 5–25 wt-%, and an additive having ZnDTC. The "PAO" is α-olefin (α-olefin oligomer) produced by oligomerization of ethylene, while the "ZnDTC" is zinc dithiocarbamate, expressed by the following structural formula.

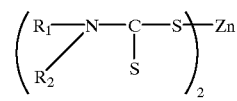

The grease composition shown above has a long life and a lubricating property excellent under high temperature conditions and has good low temperature characteristics such that its viscosity will never become too high even under low temperature conditions. Therefore, it is capable of forming a uniform sturdy oil film even under low temperature conditions, and suppressing the occurrence of abnormal noise under cold ambient. In addition, the reason for limiting the proportion of the thickener to the above range is that if the amount of the thickener is as small as less than 5% by weight, the resulting grease is a liquid that is lacking in viscosity, not suitable for being sealed in a bearing, while if it exceeds 25% by weight, the consistency is very low to the extent of decreasing its practicability for use as a grease to be sealed in a bearing. Further, the ZnDTC added as an additive is highly effective in suppressing brittle peeling, and capable of greatly increasing the durability of bearings.

As said bearing, if use is made of an arrangement (ball bearing) comprising an inner ring fixed to a shaft, an outer ring fitted in the inner portion of the pulley body and a plurality of balls interposed between the inner and outer rings, wherein among the inner and outer rings, at least the outer ring is contacted at two points by each of said balls with contact angles, then the behavior, particularly axial behavior, of the balls is suppressed by the outer ring. Therefore, the self-excited vibration of the balls is effectively suppressed; thus the occurrence of abnormal noise under cold ambient can be suppressed more reliably.

The term "contact angle" used herein refers to an angle made between the direction of a load imposed on the rolling body and a plane perpendicular to the axis of the bearing. The larger he contact angle, the greater the effect of suppressing self-excited vibration of balls. While a larger contact angle is advantageous in that this makes it less liable for abnormal noise under cold ambient to occur, too large a contact angle could lead to drawbacks including a decrease in bearing life. Thus, the contact angle should be determined within a suitable range by considering these factors.

According to a bearing for a pulley used in an automobile pulleys according to the invention, the occurrence of hoot sound can be reliably prevented by suppressing the self-excited vibration of rolling bodies. Also the occurrence of brittle peeling can be reliably prevented. Furthermore, since the grease used has the characteristic of withstanding high temperatures, there is not danger of leading to a decrease in durability at high temperatures unlike the case of a conventional pulley using a low-temperature grease that is superior only in low-temperature characteristics. Further, the bearing is not complicated in construction and is suitable for mass production and cost-effective.

BRIEF DESCRIPTION OF THE DRAWINGS

FIG. 1 (a) is a sectional view of a pulley with a bearing according to the present invention built therein, and FIG. 1 (b) is a enlarged sectional view of said bearing;

FIG. 3 is a table showing the results of evaluation tests.

DESCRIPTION OF PREFERRED EMBODIMENTS

Figure 2:
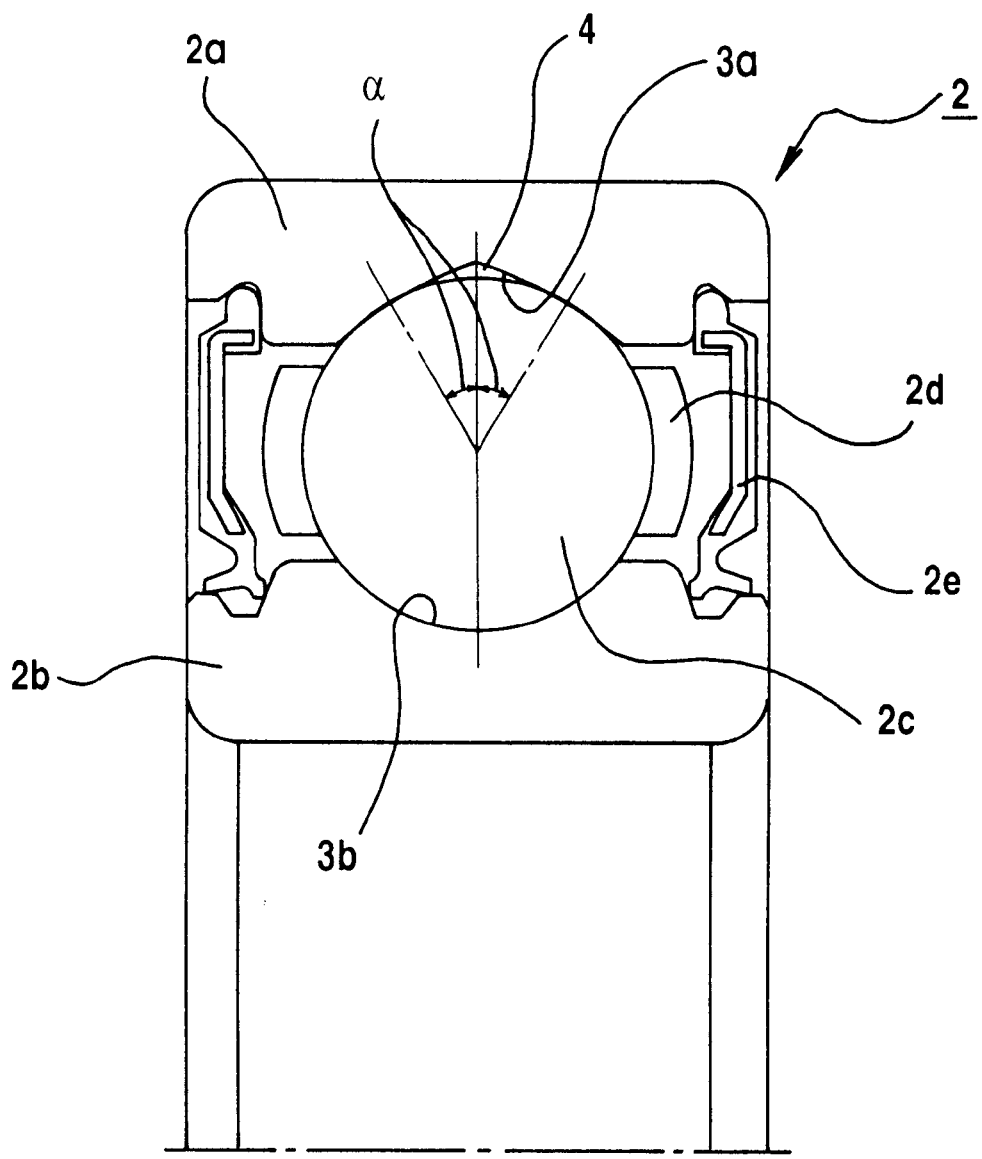
FIG. 2 is a sectional view showing a bearing according to another embodiment of the invention.

Bearings for automobile pulleys according to embodiments of the invention will now be described with reference to FIGS. 1 through 3.

Shown in FIG. 1 (a) is an example of an idler pulley used with an auxiliary machine driving belt in an automobile. This pulley comprises a pulley body 1 made by the pressing of steel sheet, and single-row deep groove ball bearing 2 fitted in the inner portion of the pulley body 1. The pulley body 1 is an annular body comprising an inner cylindrical portion 1a, a flange portion 1b extending radially outward from one end of said inner cylindrical portion 1a, an outer cylindrical portion 1c extending axially from said flange portion 1b, and a rim 1d extending radially inward from the other end of said inner cylindrical portion 1a. The outer ring 2a of the ball bearing 2 is fitted in the inner portion of the inner cylindrical portion 1a, and a pulley peripheral surface 1e to be contacted by a belt driven by the engine is formed on the outer periphery of the outer cylindrical portion 1c. This pulley peripheral surface 1e is contacted with the belt, whereby the pulley performs the function of an idler.

The ball bearing 2, as shown in FIG. 1 (b), comprises the outer ring 2a fitted in the inner portion of the inner cylindrical portion 1a of the pulley body 1, an inner ring 2b fitted on an unillustrated stationary shaft, a plurality of balls 2c installed between the raceway surfaces 3b and 3a of the inner and outer rings 2b and 2a, a cage 2d for holding the balls 2c at equal circumferential intervals, and a pair of seals 2e for sealing grease, said outer and inner rings 2a and 2b being respectively integrally formed.

Filled in said ball bearing 2 is a grease that is effective as a abnormal noise under cold ambient preventive measure and as a brittle peeling preventive measure. This grease is made mainly of a grease composition prepared by mixing PAO oil and ester oil in a ratio by weight of from 50:50 to 90:10 to provide a base oil having a viscosity of not more than 70 $mm^2/S$ at 40° C., to which base oil are then added 5–25% by weight of diurea, which is an alicyclic compound, serving as a thickener, and ZnDTC, which is an additive. Other agents, such as antioxidant, rust preventive, extreme pressure agent, and oiliness agent, may be added according to need.

FIG. 2 shows a ball bearing provided with a contact angle α as an abnormal noise under cold ambient preventive measure. This bearing has two centers of curvature with the raceway surface 3a of the outer ring 2a being in the shape of the so-called Gothic arch, wherein the ball 2c and the raceway surface 3a of the outer ring 2a are contacted with each other at two points with the deepest point on the raceway surface 3a located between the contact points (in this case, since the inner ring 2b and the ball 2c are considered to be in contact with each other at one point, the bearing shown in FIG. 2 will be hereinafter referred to as the three-point contact type). The raceway surface 3a is not limited in shape to the Gothic arch, and it is possible to employ other various shapes such that the curvature at the contact point is larger than the curvature of the ball 2c, for example, ellipse, parabola and hyperbola. In addition, the ball bearing 2 has only to be constructed such that at least he outer ring 2a and the ball 2c contact each other at two points, and there is not reason to oppose using a four-point contact type of bearing in which the inner ring 2b as well as the outer ring 2a contacts the ball 2c at two points.

The radial clearance (operating clearance) of said ball bearing in the normal operating state is preferably 5–30 μm. In a common ball bearing, theoretically, when the operating clearance of the bearing is slightly negative, the bearing life is at a maximum however, if the negative clearance increases due to variations in the working conditions occurring for some reasons or other, this leads to a sharp decrease in life and to heat generation. Therefore, the operating clearance is usually set such that although a clearance of 0 is aimed at, it is slightly large than 0 in consideration of safety factor. In contrast, experiments have shown that abnormal noise under cold ambient can be more reliably prevented by aiming at an operating clearance greater than 0 (for example, about 20 μm) than by aiming at an operating clearance of 0. It seems that the reason is that the larger the operating clearance, the more the load is concentrated on balls included in the loading region, with the result that the surface pressure on the balls increases and so does the axial rigidity of the bearing, so that small axial vibrations of the pulley are suppressed and the natural frequency increases; thus the vibrating system deviates from the abnormal noise resonance range. An extremely large operating clearance, however, trends to produce vibration and noise, lowering the bearing life; therefore, it is better to set the operating clearance within the above range.

FIG. 3 shows the results of evaluation tests conducted to prove the effectiveness of the invention. In these tests three greases (A, B, C) were used to conduct abnormal noise under cold ambient reproduction tests and brittle peeling durability tests to measure the abnormal noise occurrence rate and the durability time.

The test conditions for the abnormal noise under cold ambient reproduction tests are as follows.

Number of revolutions 2700 r/min

Load 13 Kgf

Atmosphere temperature −20° C. and upward

Operating time about 30 seconds

On the other hand, the test conditions for the brittle peeling durability tests are as follows.

Number of revolutions 0–8700 r/min cyclic

Load 220 Kgf

Atmosphere temperature room temperature

Operating time 300 hours

In FIG. 3, the greases A and B are those which have already been presented as abnormal noise under cold ambient preventing measure, and the grease C is the present invention article. In addition, these tests were conducted using bearings having no contact angle α (deep groove type), and bearings having contact angle α (three-point contact type).

It can be understood from FIG. 3 that each grease has some abnormal noise under cold ambient suppressing effect. On the other hand, in the aspect of durability against brittle peeling, the grease C showed little occurrence of white and black layers in the matrix after the passage of the target period of time (300 hours), proving that it has sufficient durability. In contrast, in the case of the greases A and B, after the passage of the target period of time, there distinctly appeared white and black layers, proving that they cannot stand actual use. Therefore, it can be understood that as compared with the greases A and B, the grease C is effective for use as a brittle peeling preventive measure.

What is claimed is:

1. A bearing for a pulley used in an automobile, fitting in the inner portion of a pulley body having a peripheral surface to be contacted by a belt driven by an engine of the automobile, and having a grease composition therein, wherein said grease composition comprises a base oil having a mixture of PAO oil and ester oil in a ratio by weight of from 50:50 to 90:10 with a viscosity of not more than 70 mm$^2$/S (at 40° C.), a thickener having alicyclic diurea compound, wherein said thickener is 5–25 wt-%, and an additive having ZnDTC.

2. A bearing for a pulley used in an automobile according to claim 1, comprising an inner ring fixed to a shaft, an outer ring fitted in the inner portion of the pulley body and a plurality of balls interposed between the inner and outer rings, wherein among the inner and outer rings, at least the outer ring is contacted at two points by each of said balls with contact angles.

* * * * *